Figure 1:
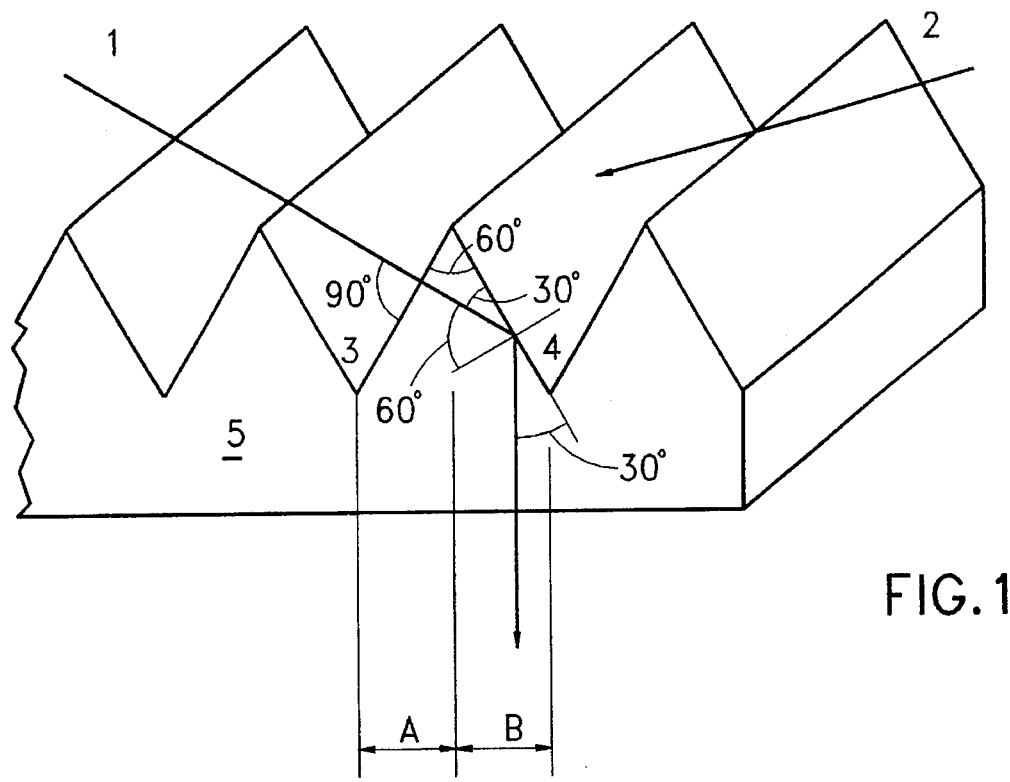

United States Patent [19]
Hernandex

[11] Patent Number: 5,453,918
[45] Date of Patent: Sep. 26, 1995

[54] COLOR ILLUMINATION APPARATUS

[76] Inventor: Fernando P. C. Hernandex, Avda. Italia 1479, Providencia, Santiago, Chile

[21] Appl. No.: 183,667
[22] Filed: Jan. 19, 1994
[51] Int. Cl.$^6$ .................................................. F21V 9/00
[52] U.S. Cl. .......................... 362/231; 362/244; 362/293; 362/331
[58] Field of Search .................................. 362/293, 234, 362/244, 231, 331, 339

[56] References Cited

U.S. PATENT DOCUMENTS

| | | | |
|---|---|---|---|
| 3,379,869 | 4/1968 | Dorman | 362/231 |
| 4,071,809 | 1/1978 | Weiss et al. | 362/231 X |
| 5,097,258 | 3/1992 | Iwaki | 362/231 X |

Primary Examiner—Stephen F. Husar
Attorney, Agent, or Firm—Emmanuel J. Lobato

[57] ABSTRACT

Apparatus for color illumination of stages, dance floors, skating rinks and the like. Prismatic plates made of a material transparent to light each have parallel triangular prisms. The prisms have an apex of 60 degrees and light sources emitting different primary color light incident on the opposite sides of the individual prisms result in combined beams of primary colors to be emitted by the individual prisms having a width corresponding to a width of a corresponding prism emitting the combined beam. The prismatic plates can be arranged so that the combined beams of the prisms of one prismatic plate are incident on a second prismatic plate having an independent light source mitting a third primary color incident thereon so that each combined beam emitted by the second prismatic plate prisms has three primary colors.

3 Claims, 1 Drawing Sheet

COLOR ILLUMINATION APPARATUS

TECHNICAL FIELD

The present invention relates to an illumination apparatus and method for color illumination of stages, dance floors, skating rinks, shows and the like. The apparatus and method of the present invention provide an economic and efficient manner to produce light beams of the widest range of colors, wherein colors can be selected manually or by mechanical means (i.e. dynamic variations of colors according to musical rhythms of preselected sequences).

BACKGROUND OF THE INVENTION

Up to the present, in order to obtain color illumination, transparent colored filters are employed; the same being placed in revolving filter holders that revolve until a determined filter is placed facing a light projector. Consequently only the colors defined by the filters can be obtained.

SUMMARY OF THE INVENTION

The proposed apparatus and method consists basically of a transparent plate having a structural design in one of its surfaces, in which surface, two beams of color light are projected with two of the primary colors (i.e. green and red); said surface design presenting different angles where reflections change the direction of the beam of light obtaining as a result, in the other surface of the plate, a resulting color which is the addition of the intensities of said two beams of light (in the example, the result is naturally yellow). The resulting beam of light is directed to a second plate of similar structural characteristics, wherein a third beam of light is projected to said second plate with a third primary color, thus producing—in accordance with the present invention—the most ample variety of colors past this second plate.

DRAWINGS

Figure 2:
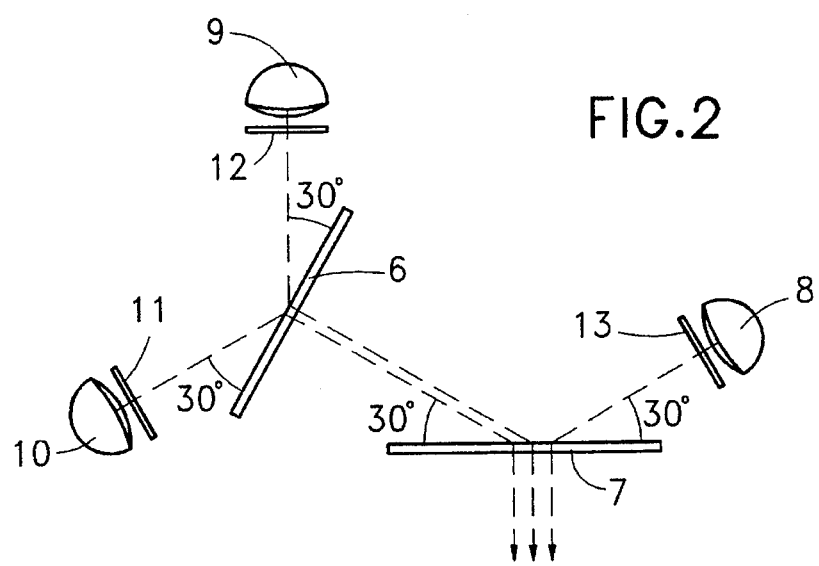

The invention will be described in relation with the accompanied drawings, wherein:

FIG. 1 is a schematic cross-sectional view of a portion of the reflection plate of the invention; and FIG. 2 is a schematic diagram of the elements which comprise an embodiment of the proposed apparatus; the same consisting of light sources, color filters and reflection plates.

DESCRIPTION OF THE INVENTION

The present invention will be described firstly in relation to FIG. 1, The beam of light (1) travels from the left in a 90° angle respect to the surface corresponding to one of the sides of the illustrated prism, the superior apex of said prism forms a 60° angle. Applying Snell's Law on the behavior of light when passing from one resource to other, we know that:

Beam (1) does not suffer refraction (change of direction) when crossing surface (3), so that it strikes surface (4) with an equal angle of 30°. In said surface, in order to apply the Snell's law, we must consider the angle formed between the beam of light (1) and a line which is perpendicular to surface (4), which in the instant case is equal to 60°. The value of this angle is greater than the value of the critical angle (hereinafter referred to), in which the phenomenon of total internal reflection occurs, so that the beam of light is completely reflected in surface (4) with an angle of 30° equal to the incidence and is projected to surface (5) perpendicularly so that it does not suffer refraction.

Light beam (2) is exactly equal to the beam (1) but opposite, that is, it travels from the right at an angle of 90° to surface (4) and is reflected by surface (3) in the same direction as beam (1). Thus, in surface (5), two bright zones are obtained (A) and (B), and they have the same dimensions but different colors.

The procedure described previously, is repeated in the same manner using a second plate of identical characteristics to said first plate, where parallel beams (1) and (2) coming from said first plate are similarly combined with a third beam of light (FIG. 2) produced to the right by light source (8); accordingly, the combination of the three primary colors is obtained.

Zones A and B must be made as small as possible in order that they are not distinguished separately, thus being able to appreciate only the resulting color of the addition of the intensities of each zone; to accomplish this, the height of the prism formed by surfaces (3) and (4) must be of approximately 1 mm.

The reflection plates can be conveniently manufactured from materials which are commercially available such as: acrylic, glass, resin materials or polyester, or their mixtures, which have refraction indexes superior to 1.49, and applying the Snell's law with this value, the following is obtained:

SNELL'S LAW $$n_1 \cdot \sin O_1 = n_2 \cdot \sin O_2$$

$n_1$=refraction index of utilized material=1.49
$O_1$=angle of incidence=critical angle
$n_2$=refraction index of the air=1.00
$O_2$=total internal reflection angle=90°

$$\sin O_1 = \frac{1.00 \cdot \sin 90°}{1.49} = \frac{1}{1.49} = 0.6711409$$

Then O=42.15°

Consequently, any beam of light that reaches surfaces (3) or (4) with an angle greater to 42.15° will be reflected completely in the surfaces, with an angle equal to the angle of incidence.

The effect observed in the other side of plate (smooth surface) corresponds to very fine light lines of alternate colors.

The sources of light (8), (9) and (10) are provided by filters of colors ((13), (12) and (11) respectively), red, green, and blue corresponding to the primary colors.

The brightness intensity of each source of light, can be regulated manually, in order to select a determined color, or it can be operated by means of known electronic devices which are commercially available, which set sequences of light according to pre-determined sequences of musical rhythms, being this one the most interesting effect of the proposed system.

FIG. 2, as indicated above, shows an scheme of the setup of the different components of the invention where numeral (6) and (7) represent the reflection plates described in FIG. 1.

The above description in no way will limit the invention which can be enhanced or improved within the scope of the same.

I claim:

1. Apparatus for color illumination of stages, dance floors, skating rinks, shows and the like comprising:

two prismatic plates made of a material transparent to light;

each plate having on a major surface thereof a plurality of spaced, parallel V-shaped grooves of equal depth and having flat side surfaces defining parallel prisms triangular in cross section and having opposite flat sides of approximately at least one millimeter in height between next adjacent grooves, each prismatic plate having a flat major surface opposite to said major surface having said V-shaped grooves thereon, each prism having an apex of 60 degrees;

two independent light sources each emitting a different primary color light beam incident on at least one prism of a same one prismatic plate, one light source disposed to emit a beam of light incident at 90 degrees on one flat side of said at least one prism and another of said light sources disposed to emit a beam of light incident at 90 degrees on an opposite flat side of said at least one prism;

whereby a resulting combined beam of said primary colors is emitted through said flat major surface of said same one prismatic plate, said combined beam having a width corresponding to a distance between next adjacent grooves defining said at least one prism;

a second one of said two prismatic plates being disposed in position for the emitted combined beam to be incident at 90 degrees on a flat side surface of at least one prism of the second one of said prismatic plates; and a third light source emitting a third primary color light beam incident at 90 degrees on a flat side surface of said at least one prism of the second one of said prismatic plates and disposed opposite to the side surface on which said combined beam is incident, whereby a beam of light is emitted from the second one of the prismatic plates containing a mixture of the primary colors.

2. Apparatus according to claim 1, in which said sources of light are of variable light intensity.

3. Apparatus according to claim 1, in which each light beam of said light sources comprises substantially parallel light rays and said combined beam comprises parallel light rays, whereby the parallel light rays are incident on corresponding prisms of the prismatic plates and a plurality of beams are emitted by said second one of said prismatic plates for illumination with a mixture of primary colors.

* * * * *